United States Patent [19]
Tokumitsu et al.

[11] 3,818,975
[45] June 25, 1974

[54] METHOD OF REMOVING CARBONACEOUS MATTER FROM HEAT EXCHANGE TUBES

[75] Inventors: Ichiro Tokumitsu; Toshisada Takemura; Minoru Sugiyama, all of Tokyo; Kenji Nishiyama, Sokashi; Shigeo Ogawa, Chibaken; Sadao Okijama, Tokorozawashi, all of Japan

[73] Assignees: Idemitsu Petrochemical Co., Ltd., both of Tokyo, Japan; Ishikawajima-Harima Jukogyo Kabushiki Kaisha, both of Tokyo, Japan

[22] Filed: May 23, 1973

[21] Appl. No.: 362,975

Related U.S. Application Data

[62] Division of Ser. No. 162,048, July 13, 1971, abandoned.

[30] Foreign Application Priority Data

July 21, 1970 Japan.................................. 45-63218

[52] U.S. Cl....................... 165/1, 165/140, 208/48 R
[51] Int. Cl................................................ F28d 7/10
[58] Field of Search.................. 208/48 R, 125, 130; 252/416; 165/1, 95, 140

[56] References Cited
UNITED STATES PATENTS

| | | | |
|---|---|---|---|
| 1,948,345 | 2/1934 | Garofalo............................. | 208/125 |
| 2,577,254 | 12/1951 | Lawson.............................. | 208/48 R |
| 2,769,772 | 11/1956 | Gomory.............................. | 208/130 |
| 2,898,384 | 8/1959 | Viriot................................. | 165/140 X |
| 2,948,516 | 8/1960 | Martinelli et al.................. | 165/70 X |
| 3,557,241 | 1/1971 | Kivlen et al....................... | 208/48 R |

*Primary Examiner*—Manuel A. Antonakas
*Attorney, Agent, or Firm*—Fred Philipitt

[57] ABSTRACT

In a heat exchanger having a tube bundle comprising a plurality of inner tubes and a plurality of cooling tubes, each of the inner tubes being arranged within each of the cooling tubes and passed therethrough to provide a double tube structure. The inside of the inner cooling tubes are gas tightly connected to both inlet and outlet chambers for high temperature fluid and the outside of the inner cooling tubes are gas-tightly connected to both inlet and outlet compartments for heat transfer medium as open ends, a high pressure lower temperature fluid is passed through the outside of the outer cooling tubes, a fluid having a high thermal conductivity, for example, molten lead, lead alloy, tin, tin alloy bismuth, sodium, salts of mercury or of sodium in a molten state, is passed through the outside of the inner cooling tubes as the heat transfer medium in ordinary case, and a gas having a low thermal conductivity is passed therethrough as a heat transfer medium when the inner tubes are required to be maintained at a high temperature.

4 Claims, 1 Drawing Figure

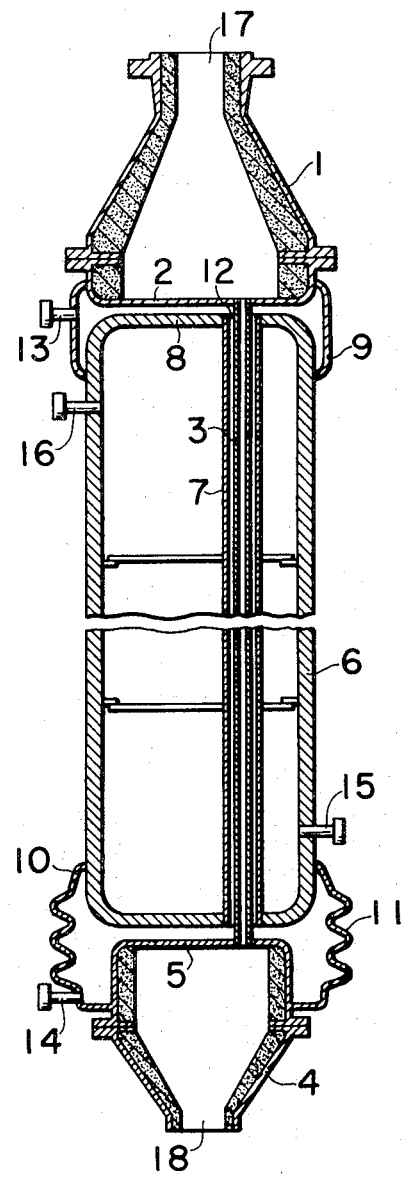

METHOD OF REMOVING CARBONACEOUS MATTER FROM HEAT EXCHANGE TUBES

This is a division of application Ser. No. 162,048 filed July 13, 1971 and now abandoned.

This invention relates to a double tube type heat exchanger having a novel structure for heat exchange between a high temperature fluid and a high pressure, low temperature fluid, and a method for using the same. More particularly, the present invention relates to a double tube type heat exchanger for heat exchange between a high temperature fluid and a high pressure, low temperature fluid, via a suitable heat transfer medium, which comprises a cooling chamber with an inlet and an outlet for a low temperature fluid, an inlet chamber and an outlet chamber for a high temperature fluid; the cooling chamber being placed between the inlet chamber and the outlet chamber; an inlet compartment and an outlet compartment for the heat transfer medium, the inlet compartment for the heat transfer medium being formed by gas-tightly providing a space between the cooling chamber and the inlet chamber for the high temperature fluid, and the outlet compartment for the heat transfer medium being formed by gas-tightly providing a space between the cooling chamber and the outlet chamber for the high temperature fluid; these inlet and outlet compartments being provided with flexible joints capable of absorbing heat expansion; a plurality of outer cooling tubes gas-tightly arranged through the cooling chamber and connected to the inlet and outlet compartments for the heat transfer medium as open ends; a plurality of inner tubes, each inner tube being arranged within and through each outer cooling tube at predetermined clearances and connected from the inlet chamber to the outlet chamber for a high temperature fluid, as open ends, each pair of the outer cooling tube and the inner tube being of a double pipe structure, the inlet compartment and the outlet compartment for the heat transfer medium communicating with each other through clearances between the outer cooling tubes and the inner tubes of said double tube structure, the high temperature fluid being passed from the inlet chamber through the inner pipes to the outlet chamber; the low temperature fluid being passed from the inlet through the cooling chamber to the outlet; the heat transfer medium being passed from the inlet compartment through the inside of the outer cooling tubes to the outlet compartment and a method for using said double tube type heat exchanger which comprises passing a liquid having a high thermal conductivity in normal case or a gas having a low thermal conductivity when it is required to maintain the insides of said inner pipes at a higher temperature.

Heretofore, various heat exchangers have been used to cool a hot product gas in a process for producing olefins or styrene, and there have been many examples of generating high pressure steam at the cooling side to recover the waste heat of the hot product gas. However, when the hot product gas is quenched, resinous condensate or carbon deposit on a gas cooling surface, and as a result, performance of the heat exchanger is not only lowered, but also a pressure drop of the gas is inconveniently increased. To eliminate such inconveniences, the deposited condensate and carbon are removed by a mechanical means. In this case, it is required to stop the relevant apparatus completely, and a few days are necessary for starting the operation again. Thus, the working efficiency is inevitably low.

To avoid these disadvantages, an attempt has been made to burn the deposited condensate and carbon, in situ, within the heat exchanger to remove them and prevent the decrease in the working efficiency of the apparatus. Not only in that case, but also in the case where high pressure steam is to be generated at the cooling side of the heat exchanger, heat transfer tubes of the heat exchanger must withstand a considerably high temperature and also must withstand a high steam pressure at the cooling side. Therefore, the heat transfer tubes must be materially and mechanically excellent. In other words, such requirements for the heat transfer tubes have a great disadvantage on the economy of the apparatus.

An object of the present invention is to provide a double tube type heat exchanger free from said disadvantage and a method for using the same.

According to the present invention, a double tube type heat exchanger having a novel structure is provided for heat exchange between a high temperature fluid and a high pressure, low temperature fluid. That is, the present heat exchanger comprises a cooling chamber with an inlet and an outlet for a low temperature fluid; an inlet chamber and an outlet chamber for a high temperature fluid; the cooling chamber being placed between the inlet chamber and the outlet chamber for a high temperature fluid; an inlet compartment and an outlet compartment for a heat transfer medium, the inlet compartment for the heat transfer medium being formed by gas-tightly providing a space between the cooling chamber and the inlet chamber for the high temperature fluid, and the outlet compartment for the heat transfer medium being formed by gas-tightly providing a space between the cooling chamber and the outlet chamber for the high temperature fluid; the inlet and outlet compartments being provided with flexible joints capable of absorbing heat expansion; a plurality of outer cooling tubes being gas-tightly arranged through the cooling chamber and connected to the inlet and outlet compartments for the heat transfer medium as open ends; a plurality of inner tubes, each inner tube being arranged within and through each outer cooling tube at predetermined clearance and connected from the inlet chamber to the outlet chamber for a high temperature fluid as open ends, each pair of the outer cooling tube and the inner tube being of a double tube structure, the inlet compartment and the outlet compartment communicating with each other through clearances between the outer cooling tubes and the inner tubes of said double tube structure; where a liquid having a high thermal conductivity is used in ordinary case as the heat transfer medium, and when the inner tubes are required to be maintained at a higher temperature to burn off the condensate and carbon deposited on the inner tubes and to remove them, a gas having a low thermal conductivity is used as the heat transfer medium, whereby the inner tubes are not in contact with the high pressure, low temperature fluid and a relatively higher mechanical strength is not required for the inner tubes. Thus, a considerable economy can be attained in the present invention. On the other hand, by using the gas having a low thermal conductivity, the inner pipes can be maintained at a higher temperature and therefore the removal of the deposited condensate and carbon by burning can be more effectively carried out. Furthermore, overheating of the cooling pipes can be thoroughly prevented.

Examples of the liquids having a high thermal conductivity used in the present invention as the heat transfer medium include such molten metals as lead, lead alloy, tin, tin alloy, bismuth, sodium, etc. or such inorganic slats as those of mercury or sodium, or the like.

Examples of the gas having a low thermal conductivity include air, helium, carbon dioxide, etc.

The present invention is also applicable to such a case where catalysts are filled in the inner tubes of the present novel double tube type heat exchanger and the packed heat exchanger is used as a tubular reactor. That is to say, such a tubular reactor is a kind of the heat exchangers, and even in that case condensates and carbon are deposited onto the catalysts by the reaction at the high temperature, and the catalytic activity is lowered. Thus, it is often necessary to remove these condensate or carbon by burning off these on the catalyst in situ.

Now, the present invention will be explained in deatil, referring to the drawing.

FIGURE is a schematic view of the double tube type heat exchanger of the present invention.

In FIGURE the present double tube type heat exchanger comprises a low temperature fluid side for cooling, a high temperature fluid side, and the remaining part of a heat transfer medium side. The part of the high temperature fluid side consists of a shell 1 of inlet chamber for high temperature fluid at the top of the apparatus, a tube plate 2 of the inlet chamber for the high temperature fluid at the bottom part of said shell 1 of the inlet chamber, a shell 4 of outlet chamber for the high temperature fluid at the bottom of the apparatus, a tube plate 5 of the outlet chamber for the high temperature fluid at the upper part of the shell 4 of the outlet chamber, and a plurality of inner tubes 3 having open ends at the tube plate 2 of inlet chamber for the high temperature fluid and the tube plate 5 of outlet chamber for the high temperature fluid. On the other hand, the part of the low temperature fluid side for cooling consists of a shell 6 for cooling chamber in the middle part of the apparatus, tube plates 8 for the cooling chamber, which close both upper and lower ends of the shell 6, and a plurality of cooling tubes 7, which gas-tightly penetrate said tube plates 8 and have said inner tubes within each of the cooling tubes 7 at a predetermined clearance 12 from said inner tube 3.

The shell 1 of inlet chamber for the high temperature fluid and the shell 6 of the cooling chamber are gastightly connected with each other by a shell 9 for the heat transfer medium at the inlet side having a projected inlet nozzle 13 for the heat transfer medium. Similarly, the shell 4 of outlet chamber for the high temperature fluid and the shell 6 of the cooling chamber are gas-tightly connected with each other by a shell 10 for the heat transfer medium at the outlet side having a projected outlet nozzle 14 for the heat transfer medium and an expansion joint 11. An inlet 15 for the low temperature fluid for cooling is provided by projection at the lower part of the shell 6 of the cooling chamber, and an outlet 16 for the low temperature fluid for cooling is provided by projection at the upper part thereof. In FIGURE numeral 17 is an inlet for the high temperature fluid, and 18 is an outlet for the high temperature fluid. In the foregoing structure, the high temperature fluid enters the inlet 17 for the high temperature fluid at the top of the shell 1 of inlet chamber for the high temperature fluid, passes through openings of the tube plate 2 of a plurality of the inner tubes 3 at the inlet chamber for the high temperature fluid and then through the inner tubes 3, enters the shell 4 of outlet chamber for the high temperature fluid and leaves the outlet 18 for the high temperature fluid at the bottom.

In the passage of the high temperature fluid, it is not necessary to circulate the heat transfer medium. The low temperature fluid for cooling is led into the shell 6 of the cooling chamber from the inlet 15 for the low temperature fluid for cooling, and discharged from the outlet 16 for the low temperature fluid for cooling at the upper part of the shell 6, whereby heat exchange is effected between the high temperature fluid and the low temperature fluid for cooling through the heat transfer medium between the inner tubes 3 and the cooling tubes 7, and the high temperature-fluid is quenched and the low temperature fluid for cooling is heated. When the high temperature fluid is an olefin-containing gas from naphtha cracking and the low temperature fluid is water, water is converted to high pressure steam.

What is claimed is:

1. In the known method for effecting heat exchange between a high temperature cracked hydrocarbon gas flowing inside the inner tubes of a set of double tubes and a high pressure low temperature fluid flowing outside the outer tubes of said set of double tubes utilizing an intermediate heat transfer medium having a high thermal conductivity that passes through the clearance zone between said outer and inner tubes, the improvement which comprises removing the deposited condensate and carbonaceous matters on the inside walls of said inner tubes when said deposited condensate and carbonaceous matters appreciably impede the heat transfer and flow of said cracked hydrocarbon gas, which comprises substituting a heat transfer medium of a lower thermal conductivity for said intermediate heat transfer medium of a high thermal conductivity and then burning off said deposited condensate and carbonaceous matters on the inner walls in situ.

2. A method according to claim 1 wherein said intermediate heat transfer medium having a high thermal conductivity is a molten material selected from the group consisting of lead, lead alloy, tin, tin alloy, bismuth, sodium, salts of mercury and salts of sodium.

3. The method according to claim 2 wherein said intermediate heat transfer medium of lower thermal conductivity is selected from the group consisting of air, helium and carbon dioxide.

4. The method according to claim 1 wherein said intermediate heat transfer medium of lower thermal conductivity is a gas selected from the group consisting of air, helium and carbon dioxide.

* * * * *